T. W. PEIRCE.
Stock Feeder.
No. 46,493.
Patented Feb. 21, 1865.
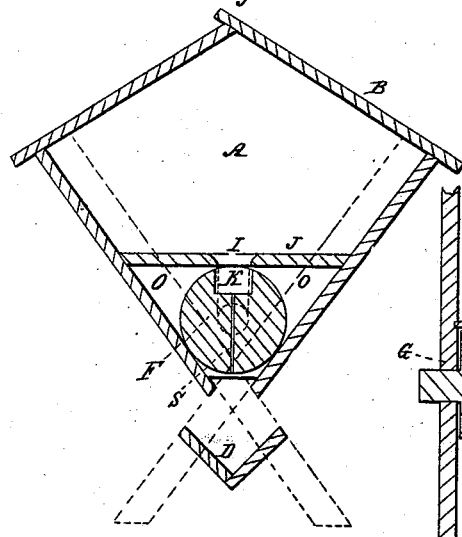
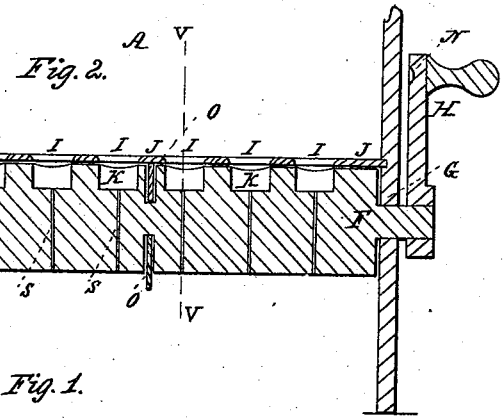
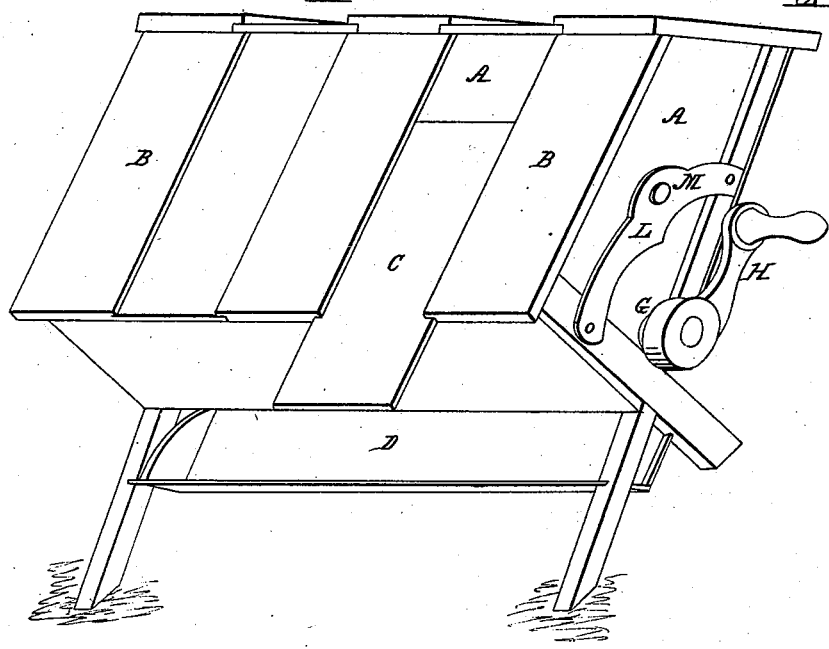
Witnesses:
Inventor:
Thomas W. Peirce

UNITED STATES PATENT OFFICE.

THOMAS W. PEIRCE, OF RICHFIELD, MINNESOTA.

IMPROVED STOCK-FEEDER.

Specification forming part of Letters Patent No. 46,493, dated February 21, 1865.

*To all whom it may concern:*

Be it known that I, THOMAS W. PEIRCE, of Richfield, in the county of Hennepin and State of Minnesota, have invented a new and Improved Stock-Feeder; and I do hereby declare the following to be a full and exact description of the same, reference being had to the accompanying drawings, making part of this specification, in which—

Figure 1 is a perspective view of my improved stock-feeder. Fig. 2 is a longitudinal section of the same with the upper part of the chest detached. Fig. 3 is a transverse section of the same, the plane of section being indicated by the line *v v*, Fig. 2.

Similar letters of reference indicate corresponding parts in the several figures.

The object of my invention is to provide a novel and simple apparatus whereby meal, grain, or other feed may be distributed or supplied to sheep, swine, and other animals without waste; and to this end the invention consists in the employment, in connection with a suitable box or chest and trough, of a rotating shaft having a series of cavities or cups, which are charged with the feed, and deposit the same into the trough while the shaft rotates.

The following description will enable others skilled in the art to which my invention appertains to fully understand and use the same.

In the accompanying drawings, A represents a chest or repository, which may be adapted to contain a greater or less quantity of grain, meal, or other feed for animals, according to the number to be fed. The roof B may project beyond the eaves, so as to form a shelter, and part of the roof consists of a sliding door, C, which admits of the ready introduction of the feed.

D is a trough supported centrally and longitudinally beneath the chest A. Within the chest A, and directly above the trough D, is a shaft or cylinder, F, having journals, for which bearings are afforded at G G in the respective ends of the chest. The shaft F is provided with a series of cups or cavities, K, which by the rotation of the shaft are caused to assume vertical positions with their mouths presented upward, so as to receive the grain or feed from the chest through the apertures I in the partition J, after which the shaft F is turned to reverse the position of the cups K and deposit the feed through a continuous opening in the bottom of the chest A into the trough D, out of which it is eaten by the animals. The shaft F is prevented from being deflected at its center from the weight of the feed by means of one or more intermediate supports, O, which may also serve in part to support the partition J.

L is a spring having a knob or projection, M, adapted to fit in a notch or recess, N, in the crank H, to prevent the turning of the shaft F when the feeding operation is suspended. By means of the crank H the shaft F may be rotated with facility. The size of the shaft F and the capacity of the cups K may be varied, but it will be desirable to know how much the cups will contain, in order that the amount of feed deposited may be properly regulated. The cups are each provided with an air-vent, S.

If it be not designed to have the chest A constitute a shelter, its form can be changed in any desired manner.

Having thus described my invention, the following is what I claim as new and desire to secure by Letters Patent:

1. The shaft F, mounted within the chest A, in the manner described, and provided with cups, which by the rotation of the shaft are filled and discharged, substantially as and for the purpose set forth.

2. The spring L and knob M, in combination with the notch or recess N, for holding the shaft F against rotation when the feeding operation is suspended.

The above specification of my new and improved grain sheep-feeder signed this 6th day of October, 1864.

THOMAS W. PEIRCE.

Witnesses:
    W. M. K. MCFARLAINE,
    J. SHIPPEN BURD.